United States Patent [19]

Enz et al.

[11] Patent Number: 4,937,227

[45] Date of Patent: Jun. 26, 1990

[54] THIN-FILM MAGNETIC HEAD INCLUDING AN INDUCTIVE TRANSDUCING ELEMENT

[75] Inventors: Ulrich E. Enz; Jacobus J. M. Ruigrok; Victor Zieren, all of Eindhoven, Netherlands

[73] Assignee: U.S. Philips Corp., New York, N.Y.

[21] Appl. No.: 218,010

[22] Filed: Jul. 12, 1988

[30] Foreign Application Priority Data

Jul. 15, 1987 [NL] Netherlands ............... 8701664

[51] Int. Cl.$^5$ ............................................. G11B 5/16
[52] U.S. Cl. ............................... 505/1; 360/120; 360/126; 360/127; 505/701
[58] Field of Search ............... 360/119, 120, 123, 124, 360/125, 126, 127, 128

[56] References Cited

U.S. PATENT DOCUMENTS 4,416,056 11/1983 Takahashi ............... 360/124

FOREIGN PATENT DOCUMENTS 1522971 10/1969 Fed. Rep. of Germany .
56-127913 10/1981 Japan .
60-154315 8/1985 Japan ............... 360/120
62-75917 4/1987 Japan ............... 360/123
62-162213 7/1987 Japan ............... 360/120
62-256209 11/1987 Japan ............... 360/123
705509 12/1979 U.S.S.R. ............... 360/123

OTHER PUBLICATIONS

Ellis, "Superconductors", Journal of Chemical Education, vol. 64, No. 10, Oct. 1987, pp. 836-841.
Japanese Patent Abstracts, (57-120 221, Jul. 27, 1982), p. 152.

Primary Examiner—John H. Wolff
Attorney, Agent, or Firm—William L. Botjer

[57] ABSTRACT

Thin-film magnetic head including an inductive transducing element (15) and a face (3) for magnetic flux coupling of the transducing element with a magnetic recording medium. A first magnetically permeable layer (5) and a second similar layer (7) together constitute a transducing gap (11). To improve the transducing function a layer (21) of a superconducting material is provided between the layers (5) and (7).

4 Claims, 1 Drawing Sheet

THIN-FILM MAGNETIC HEAD INCLUDING AN INDUCTIVE TRANSDUCING ELEMENT

BACKGROUND OF THE INVENTION

The invention relates to a thin-film magnetic head including at least an inductive transducing element and a face for magnetic flux coupling of the transducing element with a magnetic recording medium, a first magnetically permeable layer and a second magnetically permeable layer together constitute a magnetic yoke having a transducing gap present on the face, the layers extending on either side of the transducing element.

A magnetic head of this type is described in U.S. Pat. No. 4,239,587, (herein incorporated by reference) and may be used in apparatus for recording and/or reading information on a magnetic layer. Such apparatus may be intended for industrial uses, for example information storage apparatus using magnetic discs, drums or tapes, or for consumer uses, for example video recorders. The known magnetic head has two NiFe layers provided on a substrate which together constitute a magnetic yoke. A front portion of the magnetic yoke, which is intended for flux coupling with a recording medium, has a transducing gap. A rear portion of the yoke constitutes the joint between the said two layers. A flat turn of electrically insulating material insulated from the magnetic yoke and constituting the inductive transducing element is provided around the joint.

The known thin-film magnetic head has the drawback that a relatively large loss flux is produced during operation between the NiFe-layers which are provided at a small distance from each other. As a result, the known magnetic head has a rather low efficiency.

SUMMARY OF THE INVENTION

At least at the area of the gap a layer of a superconducting material is provided between the first and the second magnetically permeable layers. Superconducting material is herein understood to mean a material which is in a superconducting state and exhibits the full or substantially full Meissner effect. For practical reasons materials are preferred which have a relatively high critical temperature, for example above the temperature at which nitrogen liquefies at normal pressure. Suitable materials are, for example superconducting ceramic materials formed from compounds of lanthanum, barium, copper and oxygen such as $La_{1-x}Ba_xCuO_4$, with x between 0.15 and 0.6; lanthanum, strontium, copper and oxygen such as $La_{2-x}Sr_xCuO_4$, with x between 0.15 and 0.2; yttrium, barium, copper and oxygen such as $YBa_2Cu_3O_{7-d}$ with d between 0.0 and 1.0 or $Y_{0.4}Ba_{0.6}Cu_{1.0}O_{3.0}$; or yttrium, barium, strontium, copper and oxygen such as $YBa_{2-x}Sr_xCu_3O_8$ in which a part of the elements may be partly substituted, for example oxygen by fluorine or strontium by calcium.

The Meissner effect prevents magnetic short circuit flux from occurring between the parts of the magnetically permeable layers provided on either side of the layer of a superconducting material. Consequently, the magnetic flux density across the transducing gap at the area of the face for magnetic flux coupling of the transducing element with the magnetic recording medium can be increased considerably, which results in an essentially higher efficiency of the magnetic head. The presence of the layer of a superconducting material in the gap provides the possibility of increasing the gap height without detrimentally influencing the transducing function of the magnetic head, as is the case in the known magnetic head. A larger gap height gives the magnetic head the advantage of a longer lifetime. In fact, the recording medium moving along the magnetic head causes mechanical wear at the area of the face for magnetic flux coupling whilst the gap height is reduced. At a given minimum gap height the magnetic head is no longer usable. The lifetime of the magnetic head is therefore also determined by the magnitude of the original gap height.

A particularly favourable embodiment of the thin-film magnetic head according to the invention is characterized in that the layer of a superconducting material is also provided between the transducing element and one of the magnetically permeable layers.

Due to its magnetically protective effect the layer of a superconducting material extending over a large area prevents magnetic short circuit flux in the magnetic yoke. In other words, magnetic loss flux between the first and the second magnetically permeable layer is prevented from occurring so that the magnetic potential losses in the magnetic head can be reduced considerably with respect to the potential losses which occur in the known magnetic head, and are only dependent on the magnetic resistance of the yoke. The result of the measure according to the invention is therefore a very high efficiency.

The described object of the invention may alternatively be achieved by using a second thin-film magnetic head according to the invention having at least an inductive transducing element and a face for magnetic flux coupling of the transducing element with a magnetic recording medium, comprising a first magnetically permeable layer and a second magnetically permeable layer which together constitute a magnetic yoke having a transducing gap present on the said face, the said layers extending on either side of the transducing element which is constituted by an electrically conducting layer forming a number of turns and which is characterized in that the electrically conducting layer comprises a superconducting material, whilst at least within the magnetic yoke the distance between the juxtaposed turns of the superconducting material is smaller than the width of the separate turns.

In this magnetic head according to the invention the phenomenon is utilized that the electrical resistance of a material in a superconducting state is zero or substantially zero. Consequently, a considerable reduction of the electrical resistance of the inductive transducing element and therefore a considerable reduction of the thermal noise can be achieved so that an improvement of the signal-to-noise ratio can be obtained. Preferably, a distance between the turns will be taken which is smaller than half the width of the separate turns.

The magnetic heads according to the invention have a low electrical impedance, because this impedance is proportional to the total magnetic flux and the loss portion therein is minimized due to the measures according to the invention. This results in an extra reduction of the noise and therefore in a further improvement of the signal-to-noise ratio.

It is to be noted that DE-A No. 1,522,971 describes a method of increasing the dynamic range and improving the signal-to-noise ratio in electromagnetic tape recordings by means of a sound head having an oblique gap. To this end the sound head is locally provided with a diamagnetic material so as to intensify the magnetic field lines on the gap and to obviate a too large stray field on the gap. However, the inductive magnetic heads shown in the Figures of DE-A No. 1,522,971 and obtained in accordance with the method described have such a shape and composition that they inhibit stray flux only at those locations where the stray flux is already small and does not exert much influence on the sensitivity of the magnetic heads. Therefore, as far as the efficiency of the magnetic heads shown is concerned, it does not make much difference whether the diamagnetic material is provided or not. The gaps of the magnetic heads shown have lengths which are also defined by parts of the diamagnetic material provided and are constant over a small gap height. This means that the gap length will vary very rapidly during operation, which is due to wear of the tape contact faces of the magnetic heads and will thus result in a short life of the heads.

Furthermore it is to be noted that it is known from Japanese Patent Applications Nos. 57-120221 and 60-154315 to provide a superconducting material in the gap of a ring magnetic head. The said Patent Applications do not, however, give any information about the improvement of thin-film magnetic heads.

DESCRIPTION OF THE PREFERRED EMBODIMENT

Figure 1:
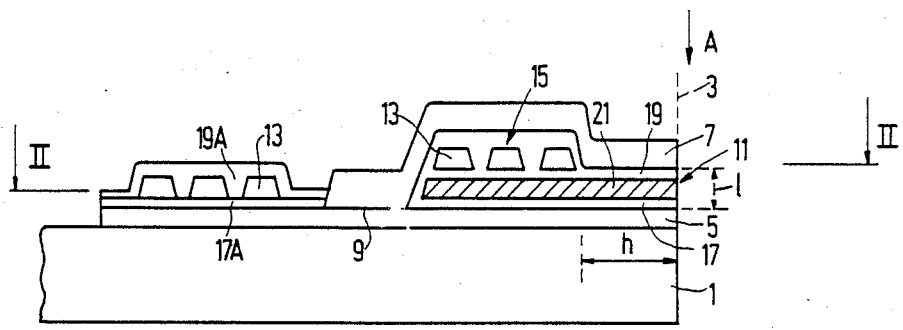
FIG. 1 is a diagrammatic cross-section of a first embodiment of the thin-film magnetic head according to the invention.
Figure 2:
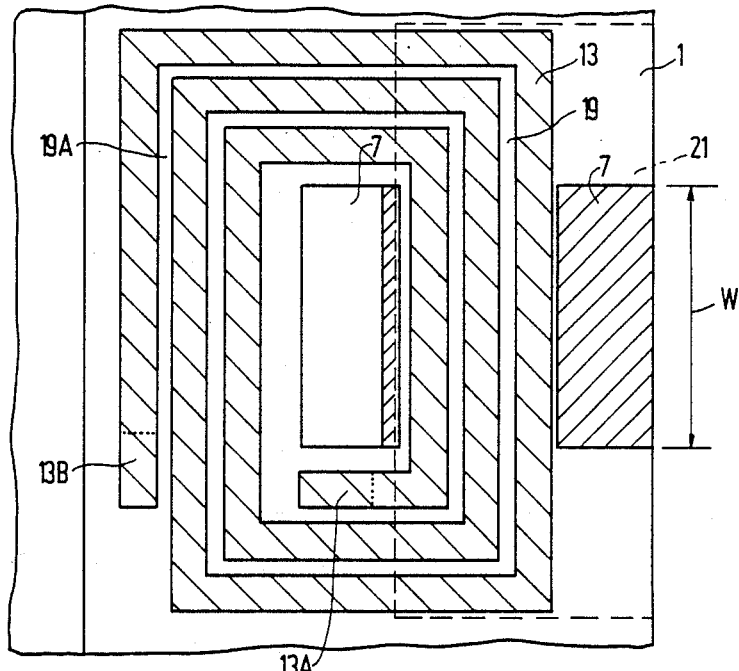
FIG. 2 is a diagrammatic cross-section taken on the arrows II—II in FIG. 1

The thin-film magnetic head according to the invention shown in FIGS. 1 and 2 forms one assembly with a substrate 1 of a wear-resistant, non-electrically conducting material such as glass or aluminium oxide and is used for magnetically recording information on a magnetic recording medium such as a magnetic tape and/or for detecting magnetic fields from such a medium. The arrow A shown indicates the direction in which the recording medium is moved along a face 3 of the magnetic head.

The magnetic head according to the invention may be manufactured as a multilayer thin-film structure provided on the substrate 1. Sputtering techniques, foto-etching techniques and electro-deposition processes and vapour-deposition processes may be used to realize the multilayer structure. Initially, a first layer 5 of a magnetically permeable material may be used, such as a nickel-iron alloy (permalloy), an iron-silicon-aluminium alloy (sendust) or amorphous alloys provided on the substrate 1. The multilayer structure also comprises a second similar layer 7 which is provided in such a way that the two magnetically permeable layers 5 and 7 are mechanically connected together in an area 9 and are insulated from each other outside this area. The layers 5 and 7 combined constitute a magnetic yoke with a transducing gap 11 adjacent the face 3 and having a gap height h, a gap length l and a gap width W. A helically extending layer 13 of an electrically conducting material, for example gold or molybdenum constituting a coil comprising a number of turns is provided around the said area 7. This coil extends between the spatially separated parts of the layers 5 and 7 and constitutes the inductive transducing element 15 of the magnetic head. The transducing gap 11 is constituted by two insulation layers 17 and 19 of electrically insulating material such as $SiO_2$ and a layer 21 a superconducting material such as $YBa_2Cu_3O_{7-d}$ extending therebetween. In the embodiment shown, the superconducting layer 21 extends from the face 3, in which the magnetic flux coupling between the transducing element and the magnetic recording medium takes place, up to the area 9 where the magnetically permeable layers 5 and 7 are magnetically connected together, and is present between the transducing element 15 and the magnetically permeable layer 5. The insulation layers 17 and 19 also extend from the face 3 and fill the space between the layer 5 and the layer 11 and between the layer 11 and the layer 7, respectively. For manufacturing technical reasons the insulation layer 19 will be locally formed from a plurality of thin layers.

Although the Figure only shows a magnetic yoke with a transducing gap 11 constituted by the magnetically permeable layers 5 and 7, a plurality of such yokes may be provided on the substrate for constituting a multitrack thin-film head according to the invention for magnetic cooperation with multitrack magnetic recording media.

The portion of the layer 13 present outside the magnetic yoke is enclosed between two insulation layers 17A and 19A of, for example quartz or a photoresist, the layer 17A being provided on the permeable layer 5. The layer 13 has two connection faces 13A and 13B to which electrical connection conductors (not shown) are connected.

Figure 3:
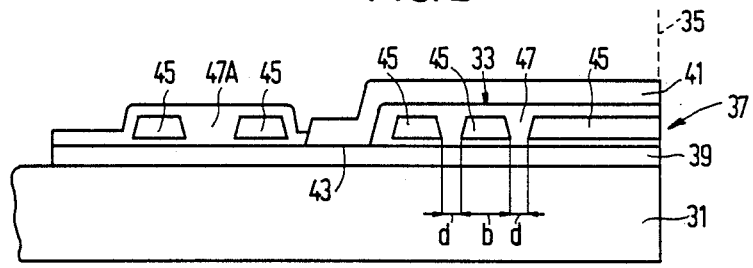
FIG. 3 is a diagrammatic cross-section of a second embodiment.

The thin-film magnetic head according to the invention shown in FIG. 3 is in the form of a multilayer structure, provided on a wear-resistant, non-electrically conducting substrate 31 and has an inductive transducing element 33, a face 35 for magnetically coupling the transducing element with a magnetic recording medium, and a magnetic yoke having a transducing gap 37. The magnetic yoke is formed by two layers 39 and 41 provided one after the other of preferably permalloy or sendust, which are magnetically connected together in a zone 43. The transducing element 33 consists of a helical winding constituted by a layer 45 of a superconducting material, for example $Y_{0.1}Ba_{0.6}Cu_{1.0}O_{3.0}$. The layer 45 is provided in such a way that the distance d between the turns of the transducing element 33, at least within the magnetic yoke, is smaller than half the smallest width b of the separate turns. In this way a superconducting shield is formed, as it were, within the magnetic yoke, which counteracts the magnetic loss flux between the layers 39 and 41 to a great extent. By locally widening the layer 45 of a superconducting material as far as the face 35, the afore-mentioned advantage of a transducing gap having a large gap height can be achieved.

Insulation layers of an electrically insulating material are provided between the layers 39, 45 and 41. The insulation layers combined are denoted by the reference numeral 47. Insulation layers denoted by the reference numeral 47A are present outside the magnetic yoke.

The invention is of course not limited to the embodiments shown. It is, for example possible within the scope of the invention to give the first magnetically permeable layer a larger thickness so that the substrate can be dispensed with.

We claim:

1. A thin-film magnetic head including at least an inductive transducing element and a face for magnetic flux coupling of the transducing element with a magnetic recording medium, comprising a first magnetically permeable layer and a second magnetically permeable layer which together constitute a magnetic yoke having a transducing gap present on said face, said layers extending on either side of the transducing element, characterized in that at least at the area of the gap a layer of a superconducting material is provided between the first and the second magnetically permeable layers.

2. A magnetic head as claimed in claim 1, characterized in that the layer of a superconducting material is also provided between the transducing element and one of said magnetically permeable layers.

3. A thin-film magnetic head including at least an inductive transducing element and a face for magnetic flux coupling of the transducing element with a magnetic recording medium, comprising a first magnetically permeable layer and a second magnetically permeable layer which together constitute a magnetic yoke having a transducing gap present on the said face, layers extending on either side of the transducing element which is constituted by an electrically conducting layer forming a plurality of turns, characterized in that the electrically conducting layer comprises a superconducting material whilst at least within the magnetic yoke the distance between the juxtaposed turns of the superconducting material is smaller than the width of the separate turns.

4. A thin-film magnetic head as claimed in claim 3, characterized in that said distance is small with respect to the said width.

* * * * *